O. HESSER.
MACHINE FOR CLOSING UP PARCELS.
APPLICATION FILED SEPT. 26, 1913.

1,106,305.

Patented Aug. 4, 1914.
12 SHEETS—SHEET 1.

Fig. 1.

Witnesses:
Arthur E. Carson
Berthe M. David

Inventor:
Otto Hesser
by
Emery Booth Janney & Varney
attys.

O. HESSER.
MACHINE FOR CLOSING UP PARCELS.
APPLICATION FILED SEPT. 26, 1913.

1,106,305.

Patented Aug. 4, 1914.
12 SHEETS—SHEET 4.

Fig. 2ª

O. HESSER.
MACHINE FOR CLOSING UP PARCELS.
APPLICATION FILED SEPT. 26, 1913.

1,106,305.

Patented Aug. 4, 1914
12 SHEETS—SHEET 6.

Fig. 3.

Witnesses:
Arthur E. Carson
Berthe M. David.

Inventor:
Otto Hesser

O. HESSER.
MACHINE FOR CLOSING UP PARCELS.
APPLICATION FILED SEPT. 26, 1913.

1,106,305.

Patented Aug. 4, 1914.
12 SHEETS—SHEET 8.

Witnesses:
Arthur E. Carson
Berthe M. David

Inventor:
Otto Hesser
by Emery Booth, Janney & Varney
attys.

O. HESSER.
MACHINE FOR CLOSING UP PARCELS.
APPLICATION FILED SEPT. 26, 1913.

1,106,305.

Patented Aug. 4, 1914.
12 SHEETS—SHEET 9.

O. HESSER.
MACHINE FOR CLOSING UP PARCELS.
APPLICATION FILED SEPT. 26, 1913.

1,106,305.

Patented Aug. 4, 1914.
12 SHEETS—SHEET 12.

Witnesses:
Arthur E. Carson
Berthe M. David

Inventor:
Otto Hesser

UNITED STATES PATENT OFFICE.

OTTO HESSER, OF CANNSTATT, GERMANY, ASSIGNOR TO THE FIRM OF FR. HESSER MASCHINENFABRIK AKTIENGESELLSCHAFT, OF CANNSTATT, NEAR STUTTGART, GERMANY.

MACHINE FOR CLOSING UP PARCELS.

1,106,305.     Specification of Letters Patent.     Patented Aug. 4, 1914.

Application filed September 26, 1913. Serial No. 792,053.

*To all whom it may concern:*

Be it known that I, OTTO HESSER, a subject of Emperor of Germany, and resident of Cannstatt, in the Kingdom of Wurttemberg, German Empire, have invented a new and useful Machine for Closing Up Parcels, of which the following is a specification.

This invention relates to a machine for closing up parcels with any contents whatever.

A main feature of the machine resides in the manner of effecting the closure with double-walled parcels having an inner envelopment of card board and an outer envelopment with longitudinal slits coöperating with a locking—or labeling—lug, as more fully described hereinafter.

Other particular features reside in the design and arrangement of the folding devices effecting at the same time the closing up or locking of the parcels and further characterizing features reside in the design of the feeding device for the parcels. Finally, specially devised means are provided to hold fast the parcels at the various places of treatment.

In order to make my invention more clear, I refer to the accompanying drawings, in which—

Fig. 1ª is a plan of the righthand half of the same; Fig. 2ª is a front-view of the righthand half of it; Fig. 2ᵇ is partly a side-view and partly a vertical section in line A¹—B¹ of Fig. 1; Fig. 3ª shows another position of the parts represented at the righthand end of Fig. 2ᵇ; Fig. 4 is a vertical section in line C—D of Fig. 1; Fig. 8 is partly a side-view and partly a vertical section through the gluing device seen in the direction to the right from the section plane G—H of Fig. 1; Figs. 8ª and 8ᵇ are two details of Fig. 8; Figs. 13–17ᵇ represent the various stages in the closing up of the parcel.

Figure 1:
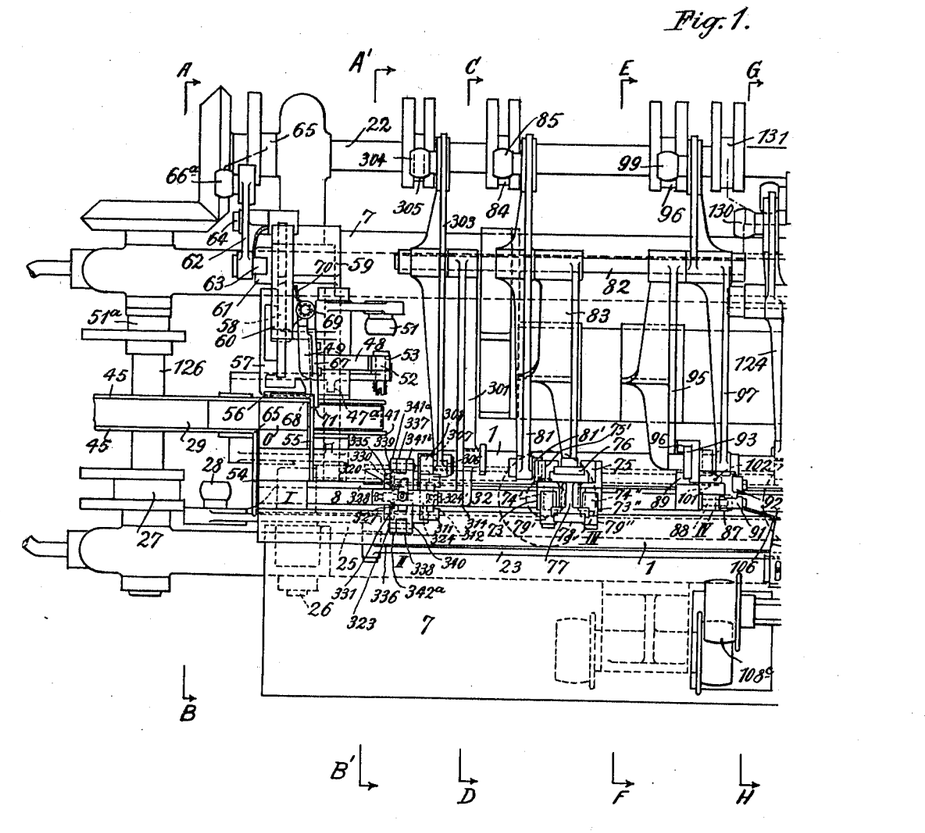
Figure 1 is a plan of the lefthand half of the machine.
Figure 1A:
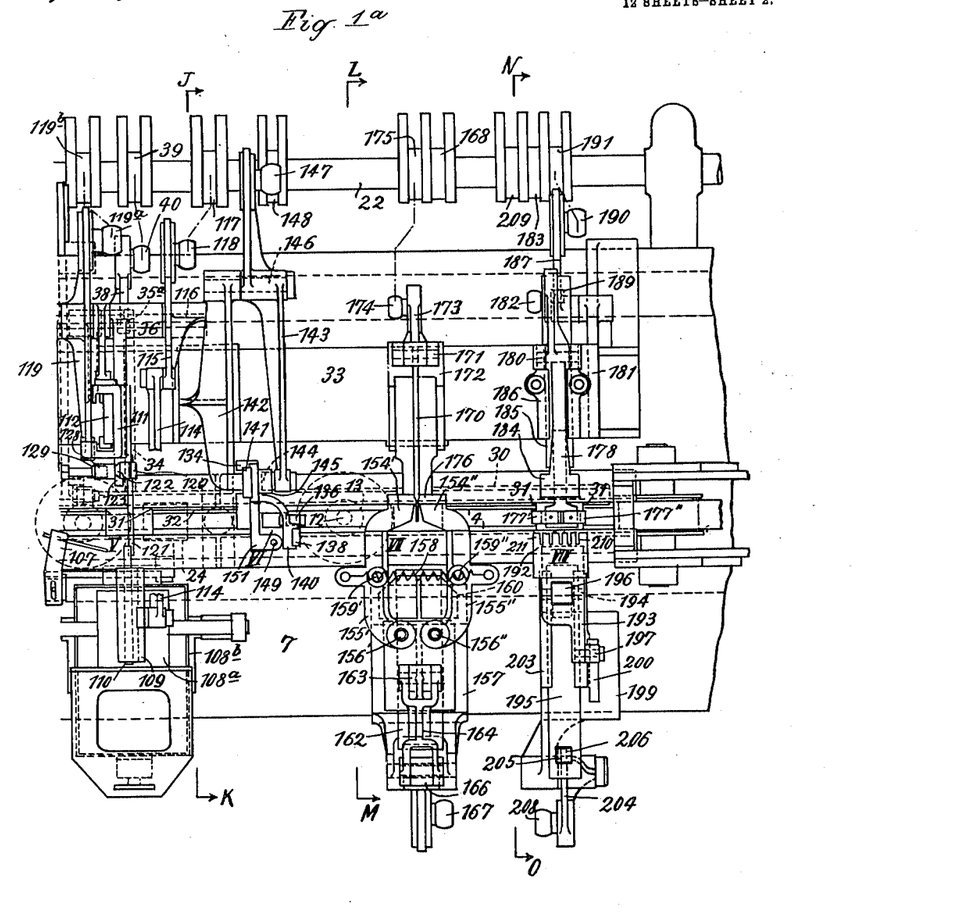
Figure 2:
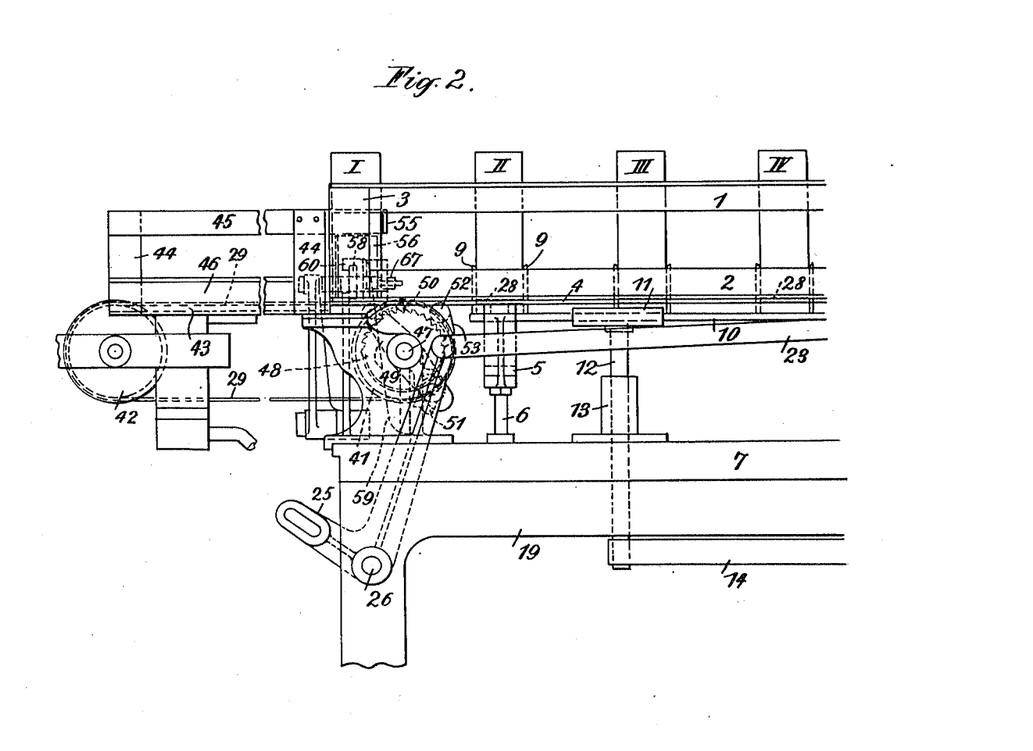
Fig. 2 is a front-view of the lefthand half of it.
Figure 2A:
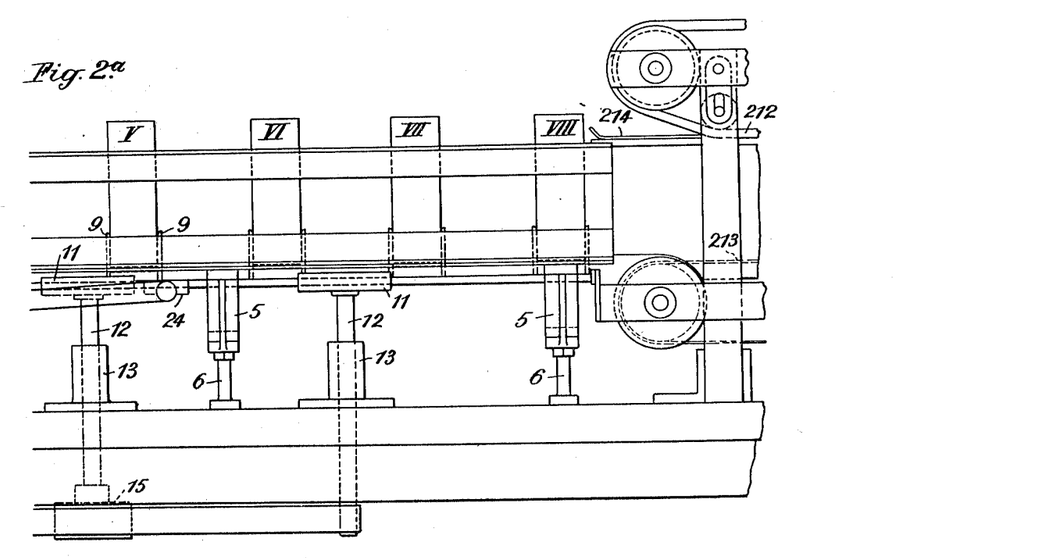
Figure 2B:
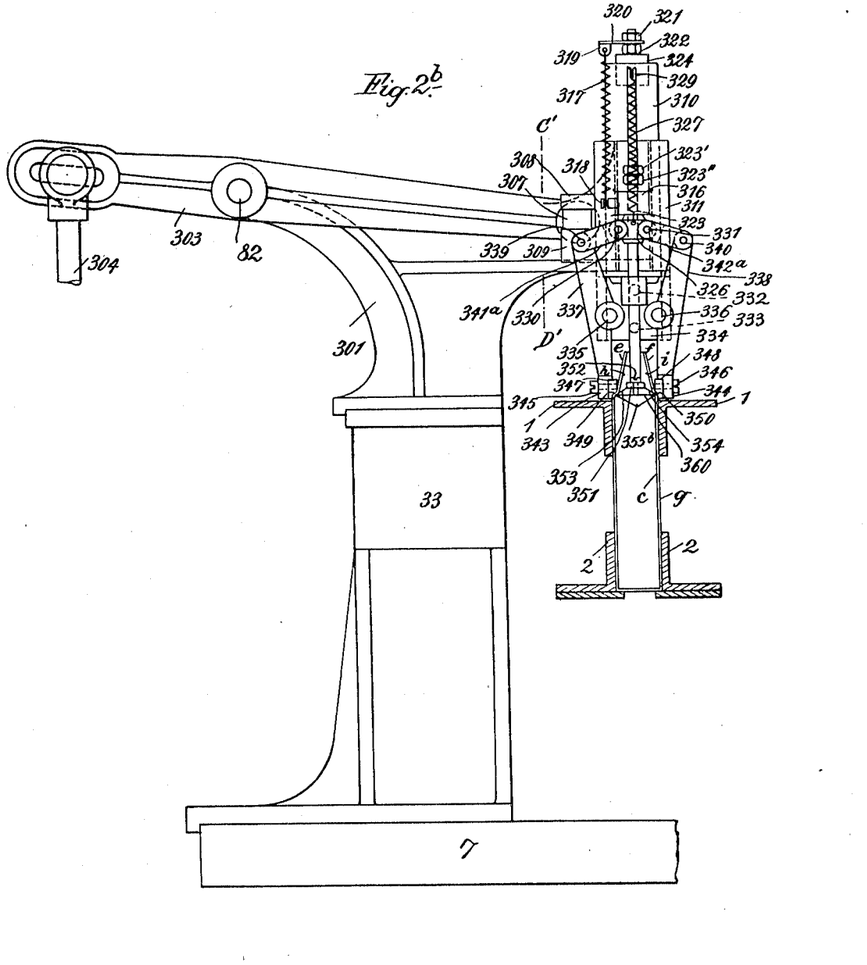
Figures 4, 5:
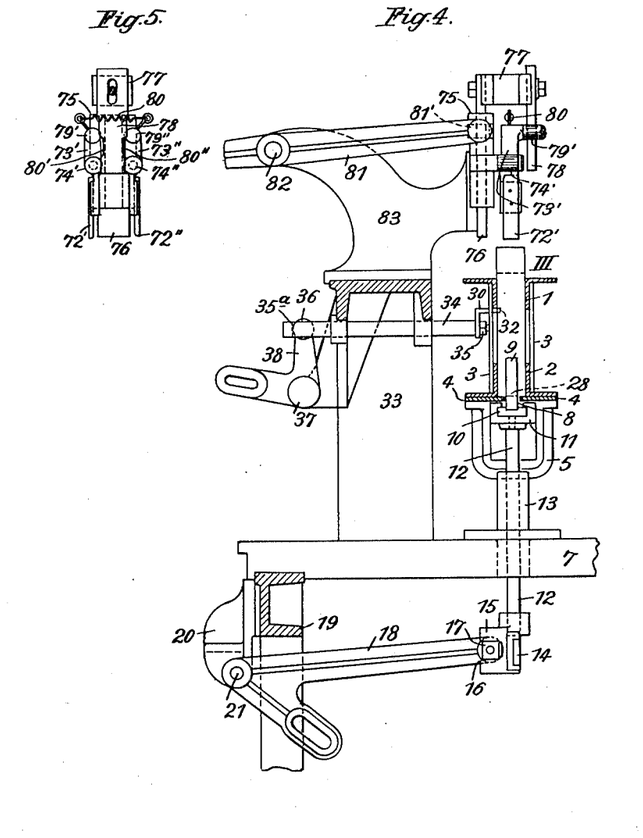
Fig. 4ª is a vertical section in line C¹—D¹ of Fig. 2ᵇ.
Fig. 5 is a front-view of the upper parts of Fig. 4.
Figure 4A:
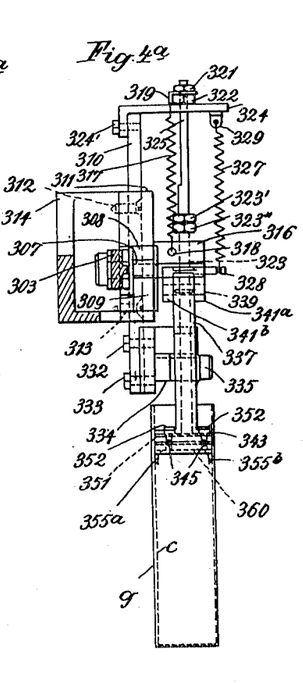

In the form of construction chosen as an example the filled, but open, parcels are fed in a straight line from the place I (Figs. 1 and 2) successively to the places II III ... VIII. The feed way is formed by a channel, the width of which corresponds to the breadth of the parcel when measured crosswise to the direction of the feed, whereas the depth of the channel is somewhat smaller than the height of the closed up parcel. The side-walls of the channel are formed by upper angular pieces 1 1 and lower angular pieces 2 2 (Figs. 1, 2, and 4) which are connected with each other by spacing pieces 3 3. The bottom of the channel is formed of two parallel longitudinal strips 4 4 which support the before-mentioned other parts of the channel and are supported in their turn by U-shaped standards 5 which rest upon adjusting screws 6 affixed to the frame 7 of the machine. Between the strips 4 4 is a slot 8 through which extend grippers 9 serving to feed the parcels along within the channel in question, in such a manner, that the grippers take hold of the parcels from below and convey them successively and intermittently from one place of treatment to the other. The grippers are moved forward together with the parcels as far as necessary, are then lowered so as to get below the parcels, are moved backward as far as necessary to enable them to take hold of the next-following parcels, are raised so as now actually to take hold of the parcels, are again moved forward together with the respective parcels, and so on. Thus, for instance, the gripper 9 shown in Fig. 2 at the place II would be lowered until its upper edges get below the bottom of the parcel; then it would be moved rearward until it arrived below the place I; then it would be lifted so as to take hold of the parcel just present at this place, and, finally, would convey it to the place II, and so on.

Figure 3:
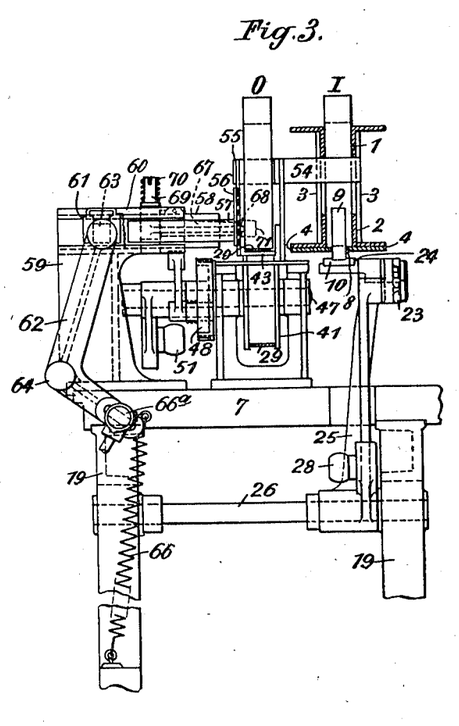
Fig. 3 is a side-view of the machine, seen in the direction to the right from the section plane A—B of Fig. 1.

The grippers 9 are affixed to a rail 10 which may be moved horizontally to and fro, as well as vertically up and down. The rail 10 is supported by guides 11 within which it may be longitudinally displaced, and the guides 11 themselves may be vertically displaced by means of supporting bars 12 arranged in sleeves 13, through which these bars extend. The lower ends of the bars 12 are connected by a rail 14, and at the middle bar the connection is effected by the mediation of a casting 15 having a recess 16 into which takes a block 17 of a bell-crank lever 18 attached to the frame part 19 by means of a bracket 20 and a bolt 21 and rocked by known means from the main shaft of the machine. Reciprocating the rail 10 horizontally is effected by a connecting bar 23 (Figs. 1, 2, and 3) which is hinged at one end to a lug 24 of the rail 10 and at the other end to a bell-crank lever 25 keyed to a shaft 26 which is oscillated in known manner by means of an eccentric 27 and its rod 28. The grippers 9 are U-shaped (Figs. 2 and 2ᵃ) and their vertical legs are connected by a special horizontal part forming a kind of bottom, the position of this bottom with regard to height being preferably such that it is situated somewhat above the strips 4 when the grippers are in the upper position. Owing to this arrangement, the parcels are somewhat lifted off the strips 4 when the grippers take hold of them and they are carried in this raised position from one place to the next without gliding along upon said strips. The parcels cannot thus be mutilated, and no damage can be done them, by the strips.

To secure the parcels in proper position at the several places of work, a rail 30 (Fig. 4) is provided along one side of the channel, and recesses 31, the distance from one another corresponds to the distance of the parcels from one another, are provided in this rail. This latter may be moved at right angles with regard to the feed channels so as to allow of the feed of the parcels when its front edge 32 is at some distance from the channel or to check the parcels by means of its recesses 31 when it is in the position shown in Fig. 4. Moving the rail 30 to and fro in this direction is effected by a bar 34 affixed at one end to said rail by a nut 35 and connected at the other end with a bell crank lever 38 by means of a projection 36 taking into a recess 35ᵃ of said bar. The bell-crank lever 38 is pivoted at 37 to a standard 33 having guide-eyes for the bar 34. The lever 38 is rocked from the shaft 22 by an eccentric 39 and its bar 40.

The parcels are conveyed to the channel by means of a conveying band or belt 29 (Figs. 1, 2, and 3) which is placed over disks 41 42 and is made to pass over the bottom of another channel formed of rails 45 and 46 which are connected by cross rods 44. The belt or band is moved intermittently by a ratchet wheel 48 secured to the shaft 47 of the disk 41, a pawl 50 attached to the lever 49, an eccentric rod actuated from the shaft 126 by means of an eccentric 51ᵃ, and another pawl 53 pivoted at 52.

At that end of the second conveying or feeding channel which is next to the main feed channel, the connection with this latter is established by angular pieces 54 55. Conveying the parcels from the position O into the position I (Figs. 1 and 3) is effected by a slide 56 which when advancing gets behind the parcel at the position O and displaces it into the position I, whence it is carried by the grippers 9 to the various places of treatment (shown in Figs. 1 and 3 partly broken away). The slide 56 is connected with a glide bar 58 by means of an angular piece 57, and said bar 58 is located in a guide 60 secured to the machine table 7 by means of a casting 59. The bar 58 has a head 61 which is connected with the bell crank lever 62 by means of the block 63 pivoted to this lever, and this latter lever is in its turn pivoted at 64 to said block 63 and may be rocked from the shaft 22 by means of the eccentric 65 and its rod 66ᵃ.

As the parcels are placed upon the band 29 without any particular regard as to their distance from one another there is some risk as to the slide 56 squeezing a parcel into the corner 65 (Fig. 1), rendering it useless, and what is worst, bringing the machine out of proper working order if the parcel in question has not yet fully arrived in the position O. To prevent such occurrences, the slide 56, the forward-movement of which may be effected by a spring 66 (Fig. 3), is generally prevented from such movement by a check 67, the projection 68 of which lies just before said slide. The check 67 is pivoted to the block 59 and is held in its checking position by means of a comparatively weak spring 70 checking the slide in question as long as it (the check) is in the just mentioned position. But when a parcel gets into the position O, it presses against the surface 71 of the check 67 and turns this latter, contrary to the action of the spring 70, as far outward as to cause the projection 68 to become disengaged from the slide 56, allowing this latter to displace the respective parcel into the position I when the transport of that parcel shall take place. The dimensions of the projection 68 in comparison to those of the surface 71 are such (Fig. 1) that the slide is disengaged only when the parcel has arrived actually in its proper position with regard to that slide.

Figure 6:
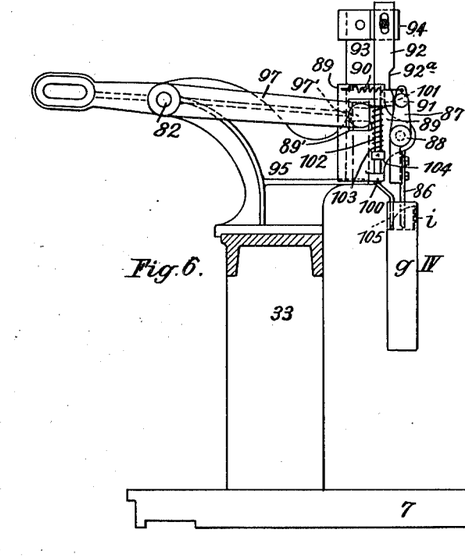
Fig. 6 is partly a side and partly a vertical section through the folding device seen in the direction to the right from the section plane E—F of Fig. 1.
Figure 7:
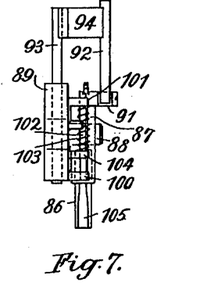
Fig. 7 is a front view of the upper parts of Fig. 6.
Figures 8, 8A, 8B:
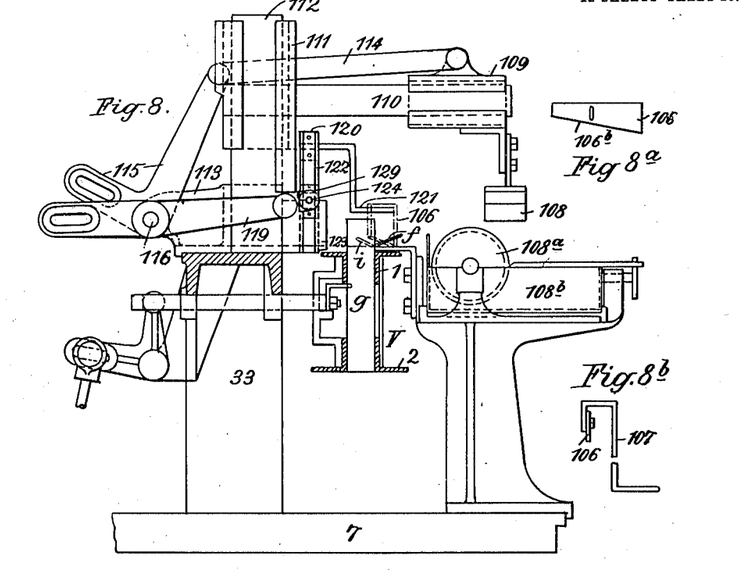
Figure 14:
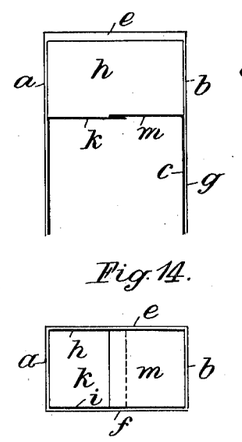
Figure 15:
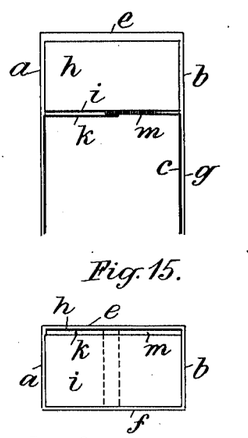

It may occur that the label-lug or locking-envelop are bent over in the manner represented in Fig. 14, which is effected by the folding tools 72′ and 72″ which are moved in this way that they first travel in a straight line until they arrive within the outer parcel envelop, but above the inner card board envelop; then they travel downward and after this their lower folding edges move outward in such a manner that the lugs $a$ and $b$ of the outer paper cover are moved off the lugs $k$ and $m$ of the inner card board envelop $c$ for a certain distance. The folding tools 72′ and 72″ moving farther downward, their lower folding edges move inward in such a manner, and so far, that they bend inward and downward the lugs $k$ and $m$ of the inner card board envelop $c$, giving them the position shown in Fig. 14. After this, the folding tools 72′, 72″ are removed to their former upper position. To move these tools in the before-described manner, they are affixed to the levers 73′ and 73″ which are pivoted to the slide 75 by means of bolts 74′ and 74″ and are provided at their ends with rolls 79′ and 79″ and are drawn against each other by a helix 80. The slide 75 may be moved up and down at a guide rail 76 secured to a casting 83, and carries a switch 78 by means of a bridge 77. The switch 78 is arranged between rolls 79′ and 79″ and is provided with incisions 80′ and 80″ of such a shape that the lower edges of the folding tools 72′ and 72″ move in the above-described manner when the slide 75 moves up and down. This movement is effected by the lever 81 pivoted at 82 to the casting 83, said lever being jointed by means of a block 81′ to a link-like projection 75′ of the slide 75 and being vertically rocked from the shaft 22 by an eccentric 84 and an eccentric rod 85. At the place IV (Figs. 1, 6, 7) the lug $i$ of the inner card board envelop $c$ is bent upon the lugs $k$ and $m$ so that the closure assumes the position represented in Fig. 16. Also in this case, the folding tool is moved in such a manner that it gets first into the interior of the outer envelop, above the inner one after which it is moved outward and moves in its turn the closing lug $f$ off the lug $i$; then the lower edge of the folding tool gets, at the further downward movement of the latter, between the lug $f$ and the lug $i$ and, moving at the same time inward, bends this lug upon the lugs $k$ and $m$ which have already been bent (Fig. 15). To make these movements possible, the folding tool 86 is also affixed to a lever 87 pivoted to a slide 89 by means of a bolt 88, said lever being kept in mesh with a switch 92 by means of a roll 91 and a spring 90. The switch 92 has a recess $92^a$, the size and formation of which is such that the folding tool 86 when moving downward performs the movements in question. The switch 92 is attached to the rail 93 by means of the bridge 94 and this rail is affixed to the casting 95. Moving the slide 89 up and down is effected by the lever 97 which is coupled, by means of a block 97′, with the link-like projection 89′ of the slide 89; said lever is pivoted at 82 to the casting 95 and is rocked from the shaft 22 by the eccentric 98 and the eccentric rod 99.

To prevent the flaps $k$ and $m$ from rising and hindering thereby bending the flap $i$, a finger 105 is provided which works at the proper time in front of the folding tool 86. Said finger forms an elongation of a spindle 102 which may be vertically displaced in the projections 100 and 101 of the slide 89, and is acted on, when this slide is in its upper position, by a spring 103 in such a way that a projection 104 is pressed against the lower projection 100. When the slide 89 moves downward, the finger 105 gets upon the flaps $m$ and $k$ and keeps them downward contrary to the spring 103, before the folding tool 86 has bent the flap $i$.

On the way from the place IV to the place V, the closing flap $f$ is bent laterally into the position shown in Fig. $15^b$. To effect this, a piece of sheet-metal 106 is arranged between said two places (Figs. 1, $8^a$, $8^b$) and is affixed to the table 7 by means of an angular piece 107. The sheet metal piece 106 takes, on the parcel being fed forward, behind the front edge of the upright closing lug $f$ and bends this laterally so as to bring it into the position shown in Fig. $15^b$. In order to effect this bending gradually, the lower edge $106^b$ of the sheet metal piece 106 is preferably made oblique in the manner shown in Fig. $8^a$.

At the place V, the lugs $i$ and $f$ are provided with liquid glue or the like at the place $n$ (indicated by hatched lines): preferably, the cementing medium is applied to both lugs at a time, viz. by the stamp 108. The stamp takes the glue from the glue roll $108^a$ which is rotated in the glue by a pulley $108^c$. The stamp 108 is affixed to a slide 109 which is moved to and fro from the shaft 22 upon the rail 110 by means of a joint 114, a bell-crank lever 115, which is pivoted at 116 to the casting 113, an eccentric rod 118, and an eccentric 117. The rail 110 is affixed to a slide 111 which is moved upward and downward from the shaft 22 along a rail 112 secured to the casting 113 by means of a bell-crank lever 119 which is pivoted at 116 to said casting 113, an eccentric rod $119^a$ and an eccentric $119^b$. The before-described means for actuating the glue stamp 108 coöperate in such a manner that the stamp is carried over the glue roller $108^a$ to the lugs $i$ $f$ (Fig. 8) and is then lowered down upon these latter providing both lugs at a time with the glue. It is important that the two lug of the outer envelop can but difficultly be caused to remain in its proper locking position, having the tendency to re-assume its former one; or that said lug when being bent or folded tears. To prevent such occurrences, the place II is furnished with a contrivance effecting a pre-folding of two oppositely arranged lugs, one of which is the locking or labeling lug, at their folding or bending edges. This is effected by means of a stamp 360 attached exchangeably by means of screws 352 to a head 351 affixed in its turn to a spindle 323. The stamp 360 has folding edges 353 and 354, and at two of its sides it is provided with swage-shaped lugs 355$^a$ and 355$^b$ which are adapted to act as cutters. The spindle 323 is guided in the cross pieces 324 and 334 which are connected with the rail 310 by the screws 324′, 332, and 333. To prevent said spindle from turning it is flattened at its upper end, at 325, and the corresponding hole in the cross-piece 324 is correspondingly shaped. The rail 310 is secured to the arm 314 of the block 301 by the screws 312 and 313, and said block is carried by the bracket 33 fixed to the machine table 7. To move the spindle 323 and the stamp 360 up and down, a slide 311 is provided, having a lug through which said spindle extends. The slide has lateral cheeks 308 and 309 which are coupled with the block 307 that is pivoted to the lever 303. This lever is supported by the shaft 82 and is rocked from the eccentric 305 of the shaft 22 by the eccentric rod 304. Above the lug 316, two counter nuts 323′ and 323″ are screwed upon the spindle 323; this latter when not in its working position is drawn against the upper surface of the lug 316 by a spring 317 and by the mediation of the lower nut 323″, said spring being affixed at one end at the pin 318 of the lug 316 and at the other end at the eye 319 of a piece of sheet metal 320 which is held in place by nuts 321 and 322 screwed upon the spindle 323. For pressing the parcel lugs against the folding edges 353 and 354 of the stamp 360, ledges 347 and 348 are provided which are exchangeably attached to the cheeks 343 and 344 of the double lever 337 and 338 by means of the screws 345 and 346. These levers are pivoted to the cross piece 334 by means of the bolts 335 and 336, and they are movably connected with a sleeve 326 by means of bolts 339, 340, hinges 341$^a$, 341$^b$, 342$^a$, 342$^b$, and bolts 330, 331, said sleeve being adapted to glide along a bar 328 and being drawn upward by a spring 327 affixed at one end to a pin 328 of the sleeve and at the other end to an eye 329 of the cross-piece 324.

Figure 3A:
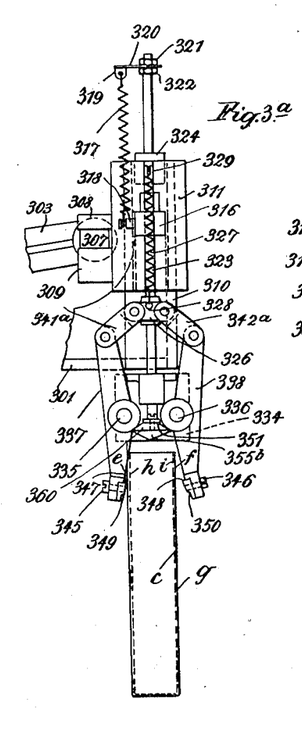

The manner of operation of the before-described combination and arrangement of parts is as follows: Suppose the parcel which has an outer envelop $g$ and an inner envelop $c$ has arrived at the place II, the parts will be in the position shown in Fig. 3$^a$. Now the slide 311 is moved downward by the lever 303 along the guide rail 310, the spindle 323 partaking in this movement by reason of its connection with said slide by the spring 317 and the nuts 323′ and 323″ until the nut 322 strikes upon the cross piece 324. The nuts 321 and 322 are adjusted in such a manner that, at the moment in question, the folding edges of the folding surfaces 353 and 354 of the stamp 360 are located near to the next place of folding. At the same time the triangular lugs 355$^a$ and 355$^b$ have pressed backward the closing lug $f$ $i$ and, perhaps, also the lugs $h$ $e$, of the card board if these lugs should have got deviated from their proper upright position, in order to render free the way for the stamp 360. Bending these lugs ($f$ $i$ $h$ $e$) involuntarily inward may occur as a consequence of a somewhat careless treatment of the parcels or of the card board having been moist when formed into envelops and its lugs having afterward become distorted by the subsequent drying. Already some time before, the projection 316 has pushed upon the upper surface of the sleeve 326 and has shoved this latter downward along the spindle 323 contrary to the spring 327, so that, by the mediation of the joints 341$^a$, 341$^b$, 342$^a$, and 342$^b$, the levers 337 and 338 are turned so far inward upon the bolts 335 and 336 with their cheeks 343 and 344 that the ledges 347 and 348 force, with their oblique edges 349 and 350, and closing lug $f$ and the lugs $e$ $h$ $i$ inward against the folding edges 353 and 354 of the stamp 360. Owing hereto, these lugs are preliminarily folded along their later folding edges for the purpose stated. When the slide 311 is again raised by the lever 303, first the sleeve 326 participates in this movement in consequence of the action of the spring 327 without the stamp 360 being raised also, so that first the ledges 347 and 348 are moved off the edges 353 and 354 by the suitable oscillation of the levers 337 and 338, in consequence of which the way for the stamp 360 is made free. Now the projection 316 pushes upon the nut 323″ and raises also the spindle and thus the stamp 360 also, until, in the upper position of the slide 311, the parts assume again the position represented in Fig. 3$^a$.

Figure 13:
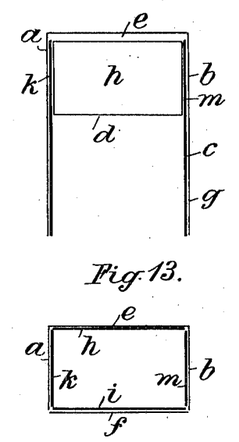

When the parcel arrives at the place III (Figs. 1, 4 and 5), it is filled about to the line $d$ (Fig. 13), and is open, and the three coherent lugs $a$ $e$ $b$, and the closing- or label lug $f$ of the outer envelop $g$, which is separated by slits from said first-mentioned lugs, as well as the lugs $h$ $i$ $k$ $m$, of the inner envelop, which are separated from one another by incisions, stand upright. At the place III the lugs $k$ and $m$ of the inner card board lugs in question lie perfectly horizontal when the glue is applied. If they were to be depressed by the stamp, the glue would be smeared over the lugs and would thus become applied also to other places instead of to the proper ones only. To hold the two lugs in question in the proper position in question, a bar 121 is provided which is moved down upon said lugs before the glue is applied to them. The bar 121 is moved up and down by a rail 122 which is rocked in its turn by a lever 124 connected by a block 128 with a link 129 connected with the rail 122, is pivoted at 116 to the casting 113, and is oscillated from the shaft 22 by an eccentric bar 130 and an eccentric 131. Before the glue-stamp 108 is pressed down upon the lugs $i$ and $k$ to provide them with glue, the bar 121 is depressed by the means described, and holds them flat, for the purpose as described. The rail 122 is guided at the projection 123 of the rail 112.

Figure 9:
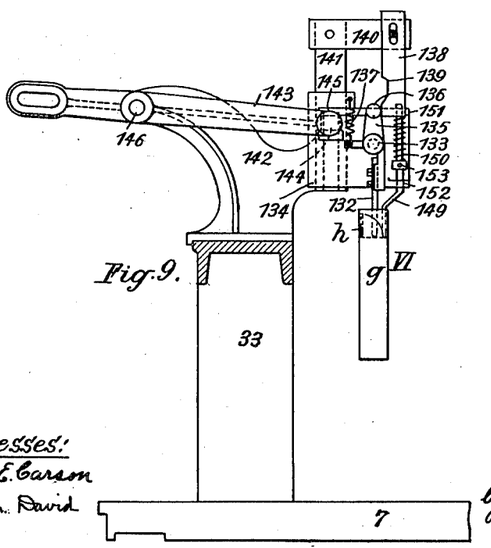
Fig. 9 is partly a side-view and partly a vertical section through the folding device seen in the direction to the right from the section plane J—K of Fig. 1ª.
Figure 16:
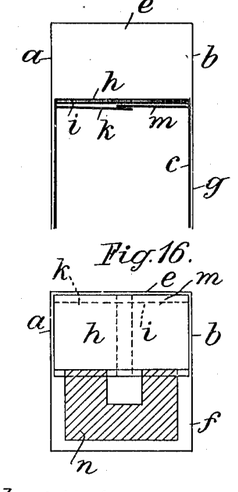

At the place VI (Fig. 9) the lug or flap $h$ of the inner card board envelop is folded, and is pressed upon the glue lug or flap $i$, as represented in Fig. 16. This is effected by a folding tool 132 which is also moved in such a manner (just as described with respect to the folding tools already treated) that it, on moving downward, first presses the lug $e$ outward off the flap $h$, then moves between the two lugs, folding the flap $h$ downward upon the glue-carrying flap $i$, the folding tool 132 assuming the position shown in Fig. 9. This tool is attached to a lever 135 fulcrumed at 133 at the slide 134, the lever with its guide-roll 136 being held in contact, by a spring 137, with the switch 138, the cut-out 139 of which is so shaped and has such a size that it can bring about the movement of the folding tool, as before described. The switch 138 is connected by the bridge 140 with the rail 141, affixed to the casting 142. Moving the slide 134 up and down is effected by the lever 143 which is coupled by a block 144 to a link 145 secured to said slide, and is fulcrumed at 146 at the casting 142 and is rocked from the shaft 22 by the eccentric rod 147 and the eccentric 148. Also at this place a finger 149 is provided which comes into operation before the folding tool 132, being put upon the flap $i$ and holding this flat under the pressure of a spring 150. The finger 149 is situated in the projections 151 152 of the slide 134 and is vertically movable in said projections in the upper position of the lever 143, the finger in question is pressed with the projection 153 by the spring 150 against the projection 152. The manner of operation and the effect of this combination and arrangement of parts is the same as described with respect to the foregoing ones.

Figure 10:
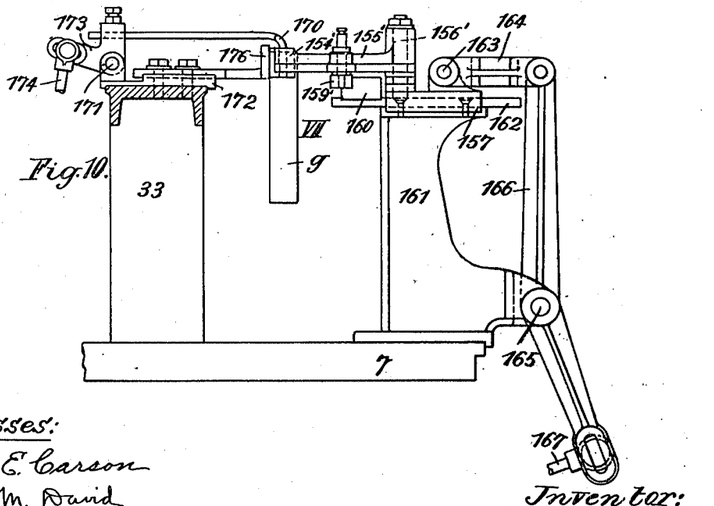
Fig. 10 is a similar representation seen from the plane L—M of Fig. 1ª.
Figure 17:
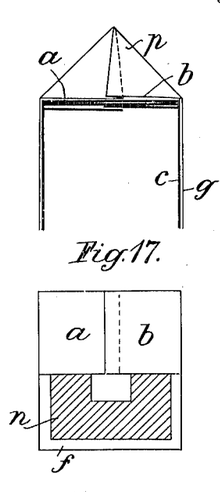

At the place VII (Fig. 10) the lugs $a$ and $b$ of the outer paper envelop are folded over into the position represented in Fig. 17. The respective folding tools 154' 154" are affixed to levers 155' 155", which are attached by bolts 156' 156" to a slide 167 and are kept in contact with a switch 160 by means of a helix 158 with guide rolls 159' 159". The switch 160 is located upon the support 161 of the machine table 7, which serves also as a guide for the slide 157. This latter is moved to and fro by means of the joint 164 which is connected with said slide by the bolt 163; further by the toggle-joint lever 166, which is pivoted at 165 to the support 161, and finally by the eccentric rod 167 and the eccentric 168 of the shaft 22. To prevent the flap $h$ bent down at the place VI from re-rising, a finger 170 is provided which gets down upon said flap and holds is flat as soon as the respective envelop has arrived at the place VII. Moving said finger against and off the said flap is effected by the bell-crank lever 173 which is fulcrumed at 171 at the support 172; further by the eccentric rod 174 and the eccentric 175 of the shaft 22. While the flap is kept down by the finger 170, the folding tools 154' and 154" are moved first forward and then also inward, catching the lateral lugs $a$ and $b$ and folding them into the position shown in Fig. 17. The movement of the folding tools is such that the latter press the folded lugs against an abutment bearing 176 affixed to the support 172, whereby a sharp break is produced.

At the place VIII (Figs. 11 and 12) the eye $p$ (Fig. 17) and the locking- or labeling-lug $f$ are folded into the position shown in Fig. 17$^b$ and said lug is firmly pressed down in order to unite the parts by means of the glue applied at the place $n$. To prevent the folded parts from re-rising when arriving at the place VIII, and thus from disturbing the further operations, there are fingers (177' and 177") provided also at this place, which are pressed from above upon the two upper side edges of the parcel situated in the longitudinal axis of the feed passage. The said fingers are provided with lateral pieces of sheet metal 179' 179" preventing a lateral deviation of the parcel rims that are held fast as described. The fingers 177' and 177" are attached to a lever fulcrumed at 180 to a support 181 and rocked vertically from the shaft 22 by means of an eccentric rod 182 and an eccentric 183. After the lateral edges have been held fast by the fingers 177' and 177", the folding tool 184 is moved from the position Fig. 11 forward through between said fingers, bending upon this way the eye $p$ into the position shown in Fig. 17$^b$. To effect this movement, the folding tool 184 is secured to a rail 185 which may be moved to and fro in the guide passage 186 of the support 181 by a lever 187, the upper end 188 of which takes into a slot 189 of said rail 185; said lever 187 is fulcrumed at 189 to the support 33 and is moved from the shaft 22 by means of an eccentric rod 190 and an eccentric 191.

Figures 11, 12:
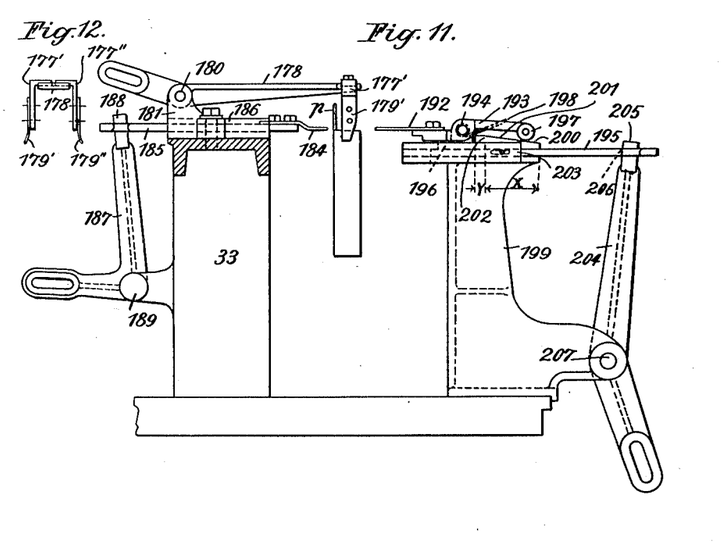
Fig. 11 is again a similar representation seen from the plane N—O of Fig. 1ª.
Fig. 12 is a detail of Fig. 11.

Bending or folding the locking- or labeling-lug $f$ is effected by the folding tool 192 which on its way forward takes behind said lug and presses it down upon the eye as soon as the folding tool 184 has returned into its former position. The folding tool 192 is secured to a lever 193 fulcrumed at 194 to a bearing 196 affixed to a rail 195; the lever 193 has a guide roll 197 which is held, by means of a helix 198, in a constant contact with a switch 200 secured to the support 199. The guide surface of the switch 200 is so shaped and has such a size (Fig. 11) that on the forward movement of the rail 195 the folding tool 192 bends the lug $f$ into the position shown in Fig. $17^b$ while the roll 197 passes through the way indicated by $x$ in Fig. 11. Further, to make the folding tool 192 press firmly upon the lug $f$, that part of the guide surface 201 which bears the reference letter $y$ in Fig. 11, is, opposite to said way $x$, provided with an upper step, as shown. The rail 195 is guided in the guide passage 203 of the support 199 and is reciprocated by the lever 204. This latter takes with its upper end 205 into a slot 206 of the rail 195, and is fulcrumed at 207 at the support 199, and is actuated from the shaft 22 by an eccentric rod 208 and an eccentric 209.

In order to render elastic the pressing action of the folding tool 192 during the time in which the guide roll 197 of said tool is situated upon the higher part $y$ of the switch 200, the said tool is provided at its front end with a number of incisions 210; said front end consists, therefore, of a plurality of fingers 211 which press elastically upon the locking lug $f$.

After the parcel has been perfectly closed at the place VIII, it is moved to and between the conveying bands or belts 212, 213, of which the first is held by vertically yieldable supports or bearings. A spontaneous disconvention of the closure upon the way of the parcel from the place VIII said bands or belts is prevented by means of a sheet metal piece 214.

Having now described my invention, what I desire to secure by a Patent of the United States is:

1. In a machine for closing up parcels with two envelops, of which the outer one has a closing- or labeling-lug, the combination, with a stamp so arranged as to be capable of being introduced into the parcel and to serve as an abutment for parcel lugs, of which said closing- or labeling-lug is one and which are located opposite to one another; folding edges provided at said stamp in the height of the folding to be effected; knife-like projections provided on the stamp at two opposite sides thereof; and means for introducing the said stamp prior to gluing up the said closing- or labeling-lug and closing thus the parcel, substantially as described.

2. In a machine for closing up parcels with two envelops, of which the outer one has a closing- or labeling-lug, the combination, with a stamp so arranged as to be capable of being introduced into the parcel and to serve as an abutment for parcel lugs, of which said closing- or labeling-lug is one, and which are located opposite to one another; ledges stepped corresponding to the folding edges of the parcel and adapted to press the lugs concerned against the stamp; levers having said ledges affixed to them; a sleeve carrying said levers; a spindle adapted to operate said stamp and passing through said sleeve; an abutment lug forming part of said spindle; means for operating said mechanism, inclusive of another abutment-lug forming part of said means and being adapted to come at several sides in contact with said first abutment lug, substantially as described.

3. In a machine for closing up parcels with two envelops, of which the inner one has four separate lugs and the outer one a closing- or labeling-lug and three coherent lugs, the combination of means for folding inward the two lugs of the inner envelop that are located laterally from said closing lug, and the inner lug situated parallel to the latter, and for folding outward the said closing lug; means for applying a cementing medium to said latter two lugs; means for folding up the fourth lug of the inner envelop and the three coherent lugs of the outer one; means for folding up the said closing lug; means adapted to be lowered in advance of the folding means and to be placed upon the folded up lugs to prevent their re-rising; and means for actuating all said means in the proper succession, substantially as described.

4. In a machine for closing up parcels with two envelops, of which the inner one has four separate lugs and the outer one a closing- or labeling-lug and three coherent lugs, the combination of means for folding inward the two lugs of the inner envelop that are located laterally from said closing lug, and the inner lug situated parallel to the latter, and for folding outward the said closing lug; means for applying a cementing medium to said latter two lugs; means for folding up the fourth lug of the inner envelop and the three coherent lugs of the outer one; means for folding up the said closing lug; a vertically displaceable member adapted to be placed upon the folded up lugs and to prevent their re-rising; a guide-way for said member; a spring so arranged as to be adapted to let the lower end of the said member project downward over the folding tool concerned; and means for actuating all said first-mentioned means in the proper succession; substantially as described.

5. In a machine for closing up parcels with two envelops, of which the inner one has four separate lugs and the outer one a closing- or labeling-lug and three coherent lugs, the combination of means for folding inward the two lugs of the inner envelop that are located laterally from said closing lug, and the inner lug situated parallel to the latter, and for folding outward the said closing lug; means for applying a cementing medium to said latter two lugs; means for folding up the fourth lug of the inner envelop and the three coherent lugs of the outer one; means for folding up the said closing lug; means adapted to be lowered in advance of the folding means and to be placed upon the folded up lugs to prevent their re-rising; said means being further adapted to take laterally upon and over the edge of the folded up lug, as well as upon and around the adjacent parcel sides; and means for actuating all said first-mentioned means in the proper succession; substantially as described.

6. In a machine for closing up parcels with two envelops, of which the inner one has four separate lugs and the outer one a closing- or labeling-lug and three coherent lugs, the combination of means for folding inward the two lugs of the inner envelop that are located laterally from said closing lug, and the inner lug situated parallel to the latter, and for folding outward the said closing lug; means for applying a cementing medium to said latter two lugs; means for folding up the fourth lug of the inner envelop and the three coherent lugs of the outer one; means for folding up the said closing lug; and a stamp adapted to apply the cementing medium at the same time to both the said latter lug of the outer envelop and the neighboring lug of the inner envelop; substantially as described.

7. In a machine for closing up parcels with two envelops, of which the inner one has four separate lugs and the outer one has a closing- or labeling-lug and three coherent lugs, the combination of means for folding inward the two lugs of the inner envelop that are located laterally from said closing lug, and the inner lug situated parallel to the latter, and for folding outward the said closing lug; means for applying a cementing medium to said latter two lugs; means for folding up the fourth lug of the inner envelop and the three coherent lugs of the outer one; means for folding up the said closing lug; and a stamp adapted to apply the cementing medium at the same time to both the said latter lug of the outer envelop and the neighboring lug of the inner envelop; and a member adapted to press down both the last mentioned lugs of the outer and inner envelops before being gummed, substantially as described.

8. In a machine for closing filled parcels, having a plurality of working places and a channel connecting them with each other, in combination, means for folding the lugs of a parcel inwardly, grippers adapted to catch the parcels from below and to carry them intermittently from every one of said working places to the next; a rail having said grippers affixed to it; and means for reciprocating said rail horizontally, as well as vertically in the proper succession, substantially and for the purpose as described.

9. In a machine for closing filled parcels, having a plurality of working places and a channel connecting them with each other, in combination, means for folding the lugs of a parcel inwardly, grippers adapted to catch the parcels from below, to lift them off the bottom of said channel, and to carry them intermittently from every one of said working places to the next; and means for moving said grippers forward, downward, rearward, and upward for the proper ways and in the proper succession and intervals, substantially as described.

10. In a machine for closing filled parcels, having a plurality of working places and a channel connecting said places with each other, in combination, means for folding the lugs of a parcel inwardly, a rail arranged at the side of said channel, incisions provided in said rail opposite to the channel and to the working places and corresponding in number and size to the parcels to be treated, and means for reciprocating the said rail with respect to the channel and parcels, grippers adapted to catch the parcels from below and to carry them intermittently from every one of said working places to the next; and means for moving said grippers forward, downward, rearward, and upward in the proper intervals, substantially as described.

11. In a machine for closing parcels with two envelops, of which the inner one has four separate lugs and the outer one a closing or labeling lug and three coherent lugs, the combination of means for folding inward the two lugs of the inner envelop that are located laterally from said closing lug, and the inner lug situated parallel to the latter, and for folding outward the said closing lug; means for applying a cementing medium to said latter two lugs; means for folding up the fourth lug of the inner envelop and the three coherent lugs of the outer one; means for folding up the said closing lug, and means for actuating all said means in the beforestated succession, substantially as described.

In testimony whereof I affix my signature in presence of two witnesses.

OTTO HESSER.

Witnesses:
 FRITZ HOLLISCHER,
 JACOB WILLIAM SCHMIDT.